US012255727B2

(12) United States Patent
Landry et al.

(10) Patent No.: US 12,255,727 B2
(45) Date of Patent: Mar. 18, 2025

(54) FORWARD DEPLOYABLE DECK BOX SYSTEM FOR THE AGGREGATION AND VISUALIZATION OF DISTRIBUTED ASSETS

(71) Applicant: The Government of the United States of America, as represented by the Secretary of the Navy, Arlington, VA (US)

(72) Inventors: Blake J. Landry, Saint Martinville, LA (US); Adam Trahan, Slidell, LA (US); Samuel Bateman, Picayune, MS (US); Charles R. Key, Diamondhead, MS (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 254 days.

(21) Appl. No.: 17/675,048

(22) Filed: Feb. 18, 2022

(65) Prior Publication Data

US 2022/0263568 A1      Aug. 18, 2022

Related U.S. Application Data

(60) Provisional application No. 63/150,845, filed on Feb. 18, 2021.

(51) Int. Cl.
*H04W 76/14*      (2018.01)
*H04B 7/185*      (2006.01)

(52) U.S. Cl.
CPC ........ *H04B 7/18513* (2013.01); *H04W 76/14* (2018.02)

(58) Field of Classification Search
CPC ..... H04W 76/14; H04W 76/15; H04W 76/18; H04W 76/19; H04W 76/20; H04W 76/23;
(Continued)

(56) References Cited

U.S. PATENT DOCUMENTS 5,926,745 A * 7/1999 Threadgill ......... H04B 7/18578
455/12.1
9,565,625 B1 * 2/2017 MacNeille ............ H04W 48/18
(Continued)

*Primary Examiner* — Jean A Gelin
(74) *Attorney, Agent, or Firm* — US Naval Research Laboratory; Nigel R. Fontenot

(57) ABSTRACT

A method including configuring, an Iridium antenna of a deck box device, to receive satellite communications based in the L band frequency range, establishing a point-to-point connection with an L-band satellite communication device via a gateway device, the L-band satellite communication device configured to receive sampled data from one or more sampling devices and receiving, by the Iridium antenna, one or more data messages from a respective sampling device via the established point-to-point connection. The method including parsing the Short Burst Data packets of each data message to retrieve the sampled data, converting, the retrieved sampled data from each respective data message into a common format, determining, one or more characteristics associated with the converted sampled data, generating a visualization based on the one or more determined characteristics, and actuating a strategic operation associated with the one or more sampling devices based on the generated visualization.

24 Claims, 8 Drawing Sheets

(58) Field of Classification Search
CPC ............... H04W 76/27; H04B 7/18513; H04B 7/18515; H04B 7/18517; H04B 7/18523; H04B 7/1853
USPC ......................................................... 370/316
See application file for complete search history.

(56) References Cited

U.S. PATENT DOCUMENTS

| | | | | |
|---|---|---|---|---|
| 9,967,595 | B1* | 5/2018 | Provost | H04N 21/2146 |
| 11,099,099 | B1* | 8/2021 | Wei | H04L 45/16 |
| 11,106,442 | B1* | 8/2021 | Hsiao | H04L 67/02 |
| 2003/0033588 | A1* | 2/2003 | Alexander | G06F 9/54 |
| | | | | 717/163 |
| 2006/0284775 | A1* | 12/2006 | Kaplan | H01Q 21/065 |
| | | | | 343/713 |
| 2010/0274573 | A1* | 10/2010 | Feied | G16H 50/70 |
| | | | | 705/2 |
| 2012/0051405 | A1* | 3/2012 | Piesinger | H04W 12/02 |
| | | | | 455/12.1 |
| 2013/0024579 | A1* | 1/2013 | Zhang | H04W 16/18 |
| | | | | 709/230 |
| 2013/0137393 | A1* | 5/2013 | Sverdlov | H04W 76/12 |
| | | | | 455/406 |
| 2016/0132314 | A1* | 5/2016 | Solsona-Palomar | G06F 9/44505 |
| | | | | 717/172 |
| 2016/0233950 | A1* | 8/2016 | Chuberre | H04L 67/2876 |
| 2016/0371967 | A1* | 12/2016 | Narang | G08B 3/10 |
| 2017/0177877 | A1* | 6/2017 | Suarez | G06F 21/6218 |
| 2017/0201435 | A1* | 7/2017 | Tan | H04L 43/14 |
| 2017/0244158 | A1* | 8/2017 | Ali | H01Q 1/1228 |
| 2018/0091251 | A1* | 3/2018 | Hanneman, Jr. | H04J 14/0283 |
| 2018/0255095 | A1* | 9/2018 | Doron | H04L 63/1458 |
| 2019/0097902 | A1* | 3/2019 | Hardin | H04L 43/0817 |
| 2019/0265971 | A1* | 8/2019 | Behzadi | G06Q 10/06 |
| 2019/0324972 | A1* | 10/2019 | Karpistsenko | G06Q 50/02 |
| 2019/0342117 | A1* | 11/2019 | Lin | H04L 69/18 |
| 2020/0067789 | A1* | 2/2020 | Khuti | H04L 41/5009 |
| 2020/0364525 | A1* | 11/2020 | Mats | G06K 19/0717 |
| 2021/0029192 | A1* | 1/2021 | Varadarajan | H04L 67/06 |
| 2021/0271966 | A1* | 9/2021 | Wang | G06N 20/00 |
| 2022/0358537 | A1* | 11/2022 | Shyu | G06N 3/08 |

* cited by examiner

FORWARD DEPLOYABLE DECK BOX SYSTEM FOR THE AGGREGATION AND VISUALIZATION OF DISTRIBUTED ASSETS

CROSS-REFERENCE

This Application is a nonprovisional application of and claims the benefit of priority under 35 U.S.C. § 119 based on U.S. Provisional Patent Application No. 63/150,845 filed on Feb. 18, 2021. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #109643.

TECHNICAL FIELD

The present disclosure is related to a deck box system, and more specifically to (but not limited to) a portable, stand-alone, forward deployed system to support deployment of multiple, distributed, heterogeneous assets within a unified operating picture.

BACKGROUND

The current inventors believe that no unified solution exists that integrates a hardware/software solution to provide a portable, stand-alone, forward deployed system to support deployment of multiple, distributed, heterogeneous assets within a unified operating picture.

Traditional systems may include using a proprietary unmanned system software/hardware, where each unmanned systems developer and system type has multiple independent software packages and interfaces for data inspection. There some drawbacks to this type of convention system and method. For example, in these systems, data is typically stored in a unique format, which creates difficulty interplaying between systems. This results in cumbersome data aggregation, and extraction impedes further analysis or creation of a laydown overview. This conventional system is designed for one or a limited number of assets, as well as for a single asset type (or assets from same company). These conditional systems therefore cannot support a full set of heterogeneous assets across different platforms or companies.

Traditional systems include ESRI ArcPortal and Topside. In ESRI ArcPortal, data aggregation, processing, and visualization software requires reach back to the server to operate. This results in a system that is not forward deployable.

In Topside, software for display and data inspection is a not stand-alone system that can receive point-to-point messages. In Topside, the ingest capabilities are dependent on reach back to outside sources delivering the data. Topside operates as a thick client on a single machine. Topside's interface gives a common operating picture with lots of detail instead of data at a glance. Topside's ingest capabilities are dependent on outside sources delivering the data into a flat file structure. Additionally. Topside is not modular and development has a steep learning curve. Topside is also written in JAVA and requires skilled developers to update.

Thus, there exists a need for a solution to provide the ability to rapidly aggregate, process, and visualize incoming data from distributed assets in a forward deployable manner.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The deck box system was developed by the Naval Research Laboratory (NRL) to assist, with rapidly aggregate, process, and visualize incoming data from distributed assets in a forward deployable manner. The deck box system that includes a deck box device that communicates and/or receives information with one or more deployed sensor devices that sample data via a satellite system and/or gateway device. The deployed sensor devices can be deployed at different locations, and can be deployed in a location separate The present disclosure provides for a method comprising configuring, an iridium antenna of a deck box device, to receive satellite communications based in the L band frequency range, and establishing, by the deck box device, a point-to-point connection with an L-band satellite communication device via a gateway device, the L-band satellite communication device configured to receive sampled data from one or more sampling devices. The method may include receiving, by the Iridium antenna of the deck box device, one or more data messages from a respective sampling device via the established point-to-point connection, each data message comprising Short Burst Data packets containing respective sampled data, and parsing, by a processing device of the deck box device, the Short Burst Data packets of each data message to retrieve the sampled data. The method may include converting, by the processing device of the deck box device, the retrieved sampled data from each respective data message into a common format, and responsive to the converting, determining, by the processing device of the deck box device, one or more characteristics associated with the converted sampled data. The method may include generating, by a display device of the deck box device, a visualization based on the one or more determined characteristics, and actuating a strategic operation associated with the one or more sampling devices based on the generated visualization.

The present disclosure provides for a deck box device, comprising: a processing device coupled to a memory device storing executable instructions; an Iridium antenna configured to receive satellite communications based in the L band frequency range; and a display device, wherein execution of the executable instructions causes the processing device to perform steps. The steps may include establishing, by the deck box device, a point-to-point connection with an L-band satellite communication device via a gateway device, the L-band satellite communication device configured to receive sampled data from one or more sampling devices, and receiving, by the Iridium antenna of the deck box device, one or more data messages from a respective sampling device via the established point-to-point connection, each data message comprising Short Burst Data packets containing respective sampled data. The steps may include parsing, by the processing device of the deck box device, the Short Burst Data packets of each data message to retrieve the sampled data, and converting, by the processing device of the deck box device, the retrieved sampled data from each respective data message into a common format. The steps may include responsive to the converting, determining, by the processing device of the deck box device, one or more characteristics associated with the converted sampled data, and generating, by the display device of the deck box device, a visualization based on the one or more determined characteristics actuating a strategic operation associated with the one or more sampling devices based on the generated visualization.

The present disclosure provides for a non-transitory computer readable medium comprising computer code, the computer code, when executed by a processor, causes the processor to perform steps. The steps may include establishing, by a deck box device, a point-to-point connection with an L-band satellite communication device via a gateway device, the L-band satellite communication device configured to receive sampled data from one or more sampling devices, and receiving, by an Iridium antenna of the deck box device, one or more data messages from a respective sampling device via the established point-to-point connection, each data message comprising Short Burst Data packets containing respective sampled data, the Iridium antenna configured to receive satellite communications based in the L band frequency range. The steps may include parsing, by a processing device of the deck box device, the Short Burst Data packets of each data message to retrieve the sampled data, and converting, by the processing device of the deck box device, the retrieved sampled data from each respective data message into a common format. The steps may include responsive to the converting, determining, by the processing device of the deck box device, one or more characteristics associated with the converted sampled data, generating, by a display device of the deck box device, a visualization based on the one or more determined characteristics, and actuating a strategic operation associated with the one or more sampling devices based on the generated visualization.

DETAILED DESCRIPTION

Figure 1:
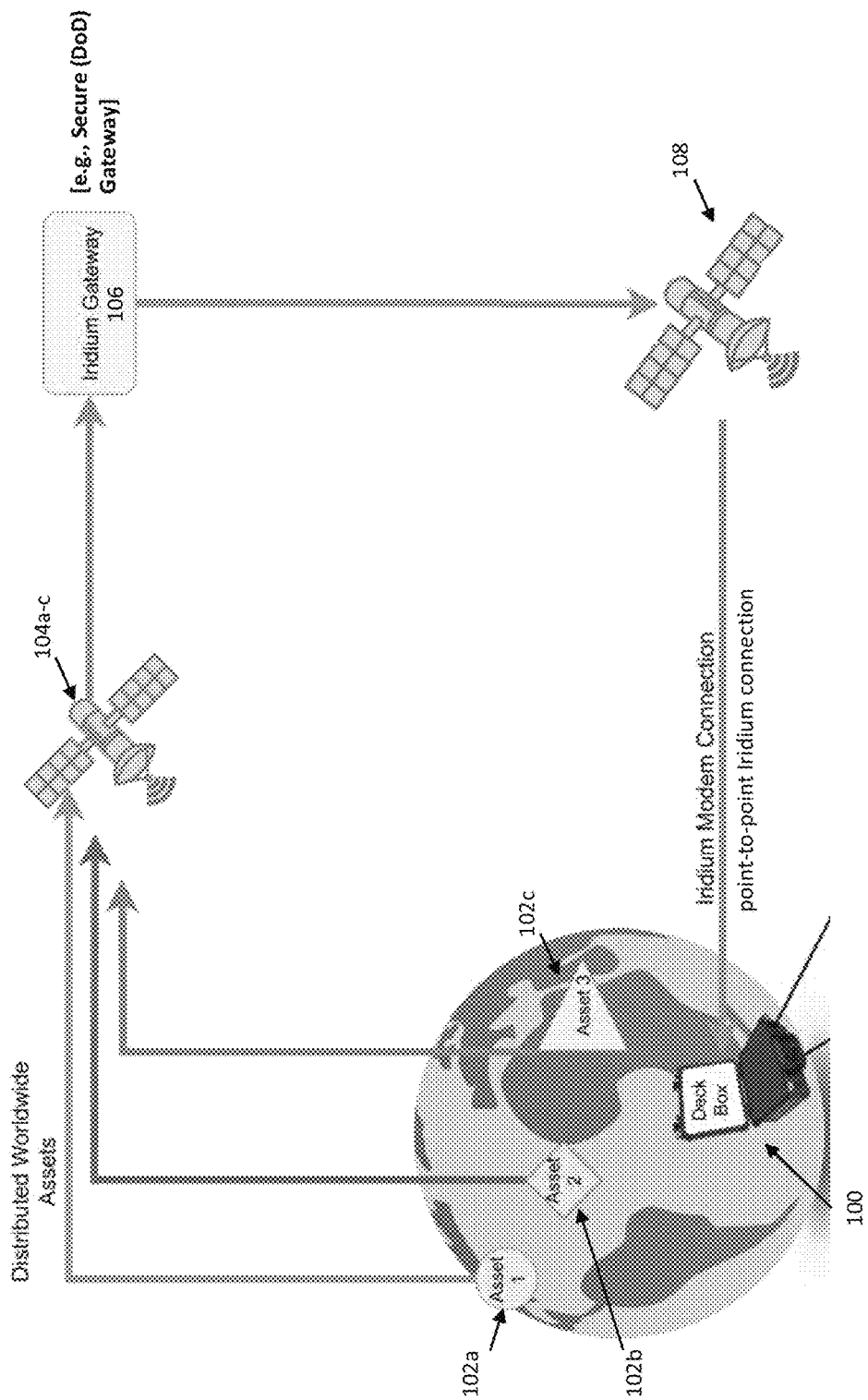
FIG. 1 illustrates an exemplary block diagram of an embodiment of a deck box system, in accordance with disclosed aspects.

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present disclosure provides for embodiments of a forward deployable deck box system for the aggregation and/or visualization, of distributed assets and operation thereof.

The ability to rapidly aggregate, process, and visualize incoming data from distributed assets in a forward deployable manner is important for field and laboratory experiments over a broad range of engineering, scientific, and defense applications. The present disclosure provides for a portable, forward deployable, stand-alone system (e.g., can be a fusion of hardware and software) to collect, analyze, and display information from multiple distributed heterogeneous assets.

Current systems and methods of data aggregation, processing, and visualization from distributed assets require proprietary software packages and interfaces for data inspection. To address the drawbacks of current systems, the present disclosure provides a unified solution for scientific deployments where multiple types of distributed assets may be involved. According to some aspects, proprietary skill or knowledge might not be required to operate one or more features or embodiments, making aspects easily deployed and/or used in many settings or situations.

The forward deployable deck box system can include one or more software components, which handles the act of data aggregation, processing, and visualization. The forward deployable deck box system can include one or more hardware components which can run the software and can include communication packages to allow for data collection.

One or more aspects described herein may be provided in a programming language, such as Python, that may allow for quick development and customization, be lightweight and nimble, and/or be browser-based. For example, one or more aspects may include a processing component and a visualization component. The processing component may be structured to be modular and quickly setup, configured, and updated by less experienced developers, in contrast to traditional systems. The visualization component can be a generated output, such as a display dashboard which can be accessed through a browser by one or more users, such as users connected to the same local network as the deck box. Additionally, each software component is capable of working independently of one another, or in unison with at least one other component.

The hardware component allows for direct Iridium network connectivity removing the need to connect to a network to retrieve data. This allows the deck box to be deployed across the globe. The present disclosure provides for forward deployment in that reach back to a local or private network is not necessary because, in one example, the present disclosure uses Iridium satellite systems to communicate with assets deployed in the field. The present disclosure provides for a web-based interface to allow other devices to connect to and access data from the deck box device.

In some embodiments, the forward deployable system is integrated into a relatively compact (e.g., about 40-70 cm×30-50 cm×15-30 cm, or the like) carrying case for protection and ease of transport and deployment. The box can be powered internally through an integrated battery or externally. The deck box device may be able to connect to local Wi-Fi and host a webserver to serve the visualization dashboard. The deck box device can include a processing device, such as a Raspberry Pi 4B (or other device), to run and/or execute the integrated software and/or features described herein. The deck box can include an onboard storage device.

An integrated monitor can be located within the lid of the carrying case, and the deck box can be interfaced with a touchscreen, a keyboard, and/or a mouse (or other input device). In addition to a keyboard and mouse setup, the deck box can connect with secondary devices using a laptop or cell phone using wireless or Ethernet connection. In some embodiments, the deck box can also take the form of a dedicated network server which the integrated software can run.

The deck box can provide an all-in-package hardware to collect data while the integrated software processor analyzes and display information from multiple distributed heterogeneous assets. This can happen in-situ in a forward deployed manner and can be deployed, anywhere on the planet by leveraging the global Iridium network.

FIG. 1 illustrates an exemplary block diagram of an embodiment of a deck box system 10. The deck box system 10 may include a deck box device 100, which may be coupled to and/or communicate with one or more devices or assets, instruments, or sensor devices 102a-102c, such as via satellite communication. Each of the deck box device 100 may be connected to communication with one or more sensing devices 102a-c, which may be configured to sample data. For example, the sensor devices 102a-c may be located in different geographical locations. The sensor devices 102a-c may communicate with a satellite system 104a-c, 108, such as an Iridium satellite system and/or constellation. The sensor devices 102a-c can be, for example, velocity meters, water level sensors, cameras, drifters, autonomous vehicles (aerial, ground, surface, underwater, and the like), satellite beacon devices, etc.

According to some aspects, the deck box device 100 may include a receiving device, such as a receiver or transceiver. In some cases, the receiving the device may be an antenna, such as an Iridium antenna that may be configured to receive satellite communications from a satellite (or some other source). The satellite communications may be based in the L band frequency range, such as provided via an Iridium satellite (e.g., satellites 104, 108), such as an Iridium satellite constellation that can provide a constant world coverage.

The deck box device 100 may establish a connection with the satellite 108. For example, the deck box device 100 may include a modem (e.g., Iridium Modem) that may be used to establish a point-to-point connection with the Iridium satellite 108. The modem may be coupled to a GPS antenna of the deck box device 100, which may be used to facilitate the point-to-point connection, to provide a location associated with the deck box device 100 and/or modem, and/or to communicate GPS information to other devices.

The deck box device 100 provides a portable, stand-alone, forward deployed system that receives point-to-point Iridium communication that might not require a connected cloud infrastructure. In some cases, the connection may be via a secure gateway device 106 that may receive sampled data via the satellite 108 from one or more sensor devices 102a-c. The secure gateway device 106 may be located at a different geolocation from the deck box device 100, or it may be located in close proximity.

In this way, according to disclosed aspects, the one or more sensor devices 102a-c may sample data. The one or more sensor devices 102a-c may send the sampled data to the satellite system 104. The satellite system 104 may be part of a collection of satellites that work together to provide a wide coverage. For example, in the case of an Iridium satellite constellation system, the sensor device 102a may be in proximity to a first satellite device 104a of a satellite constellation and may communicate with that first satellite device 104a, the sensor device 102b may be in proximity to a second satellite device 104b of the satellite constellation and may communicate with that second satellite device 104b, and/or the sensor device 102c may be in proximity to a third satellite device 104c of the satellite constellation and may communicate with that third satellite device 104c. In some embodiments, the satellite devices 104a-c may be the same or different, depending on proximity of each sensor device 102a-c with another sensor device 102a-c The satellite system 104 (e.g., the one or more satellites 104a-c that may have received data from the one or more devices 102a-c) may transmit the sampled data to a gateway device, such as the Iridium gateway 106. The Iridium gateway 106 may be a secure gateway device associated with strategic operations, such as defensive tactical operations. For example, the gateway 106 may be a secured Gateway, such a Department of Defense Gateway device. The gateway 106 may process the data, such as by using a lookup table to determine where the transmission should be sent (e.g., toward the deck box device 100). The gateway 106 may transmit the sampled data to a satellite system 108, which may be part of the same satellite constellation as satellite system 104 (e.g., Iridium satellite system or constellation), which may transmit the sampled data to the deck box device 100.

In some embodiments, the satellite devices 104a-c may be the same or different from satellite device 108, depending on proximity associated with gateway 106 with the satellite constellation and on the configuration of the satellite constellation at the time of transmission. In some embodiments, the asset will communicate with the closest satellite to the asset (e.g., sensor device 102a-c), and the deck box device 100 will receive data from the closest satellite to the deck box device 100.

In some cases, the gateway 106 may bypass satellite 108 and transmit the sampled data to the deck box device 100, such as if the gateway 106 is in close proximity to the deck box device 100.

The deck box device 100 may receive, parse, convert, and/or store the sampled data. The deck box device can generate a visualization associated with the sampled data, such as to provide information associated with the one or more sensor devices 102a-c. The visualization can be dynamically updated based on continually receiving sampled data via the system 100. In some cases, the visualization can show a relationship between the one or more sensor devices 102a-c. For example, the characteristics and/or visualization may be used to track assets (e.g., sensor devices 102a-c), such as tracking velocity, geolocation, depth in fluid, spatial orientation, direction, and the like. This could be of particular relevance for naval applications. In those cases, the visualization may be used by naval or water personnel to track deployed naval assets.

In some cases, the characteristics and/or visualization may be used to visualize metrics and/or analytics associated with the sensor devices 102a-c, such as being related to one or more of the characteristics. For example, the visualization can provide a real-time display of asset location, such as historical location and current location. In another example, aspects described herein provide for a real-time awareness of assets for coordinated deployment efforts of sensor devices 102*a-c*. Aspects described herein can provide for tracking and or locating lost assets in areas of limited or no internet connectivity. The present disclosure may be scalable to an arbitrary number of spatial distributed of nodes or assets 102 without impacting performance of the system 10.

Figure 2:
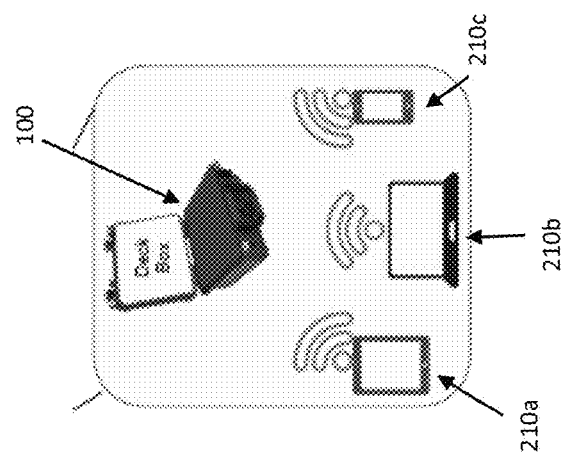
FIG. 2 illustrates an example deck box device, in accordance with disclosed aspects.
Figure 2:
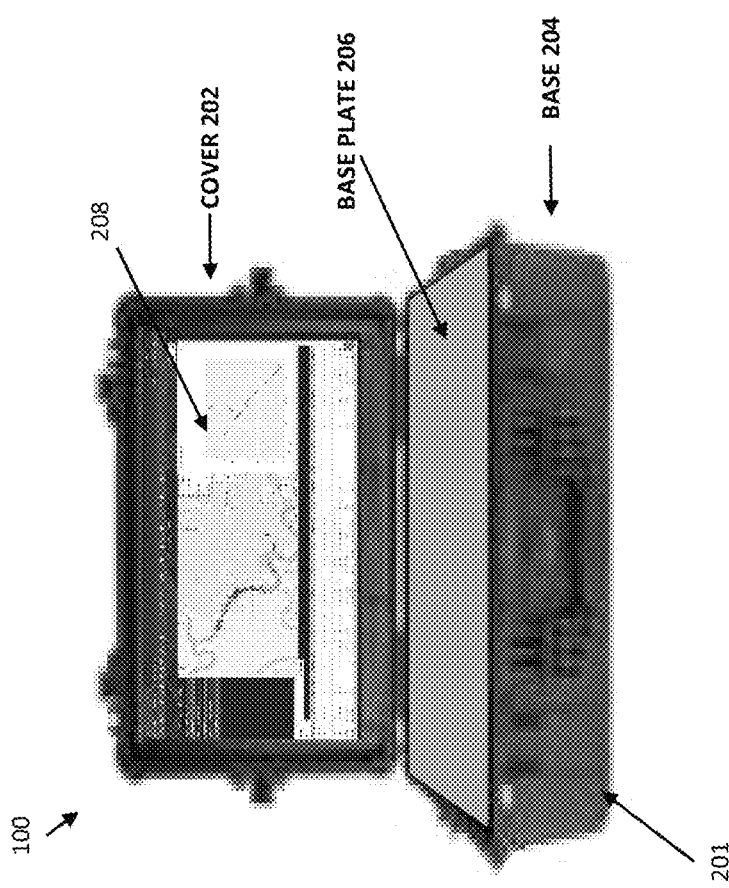
Figure 3:
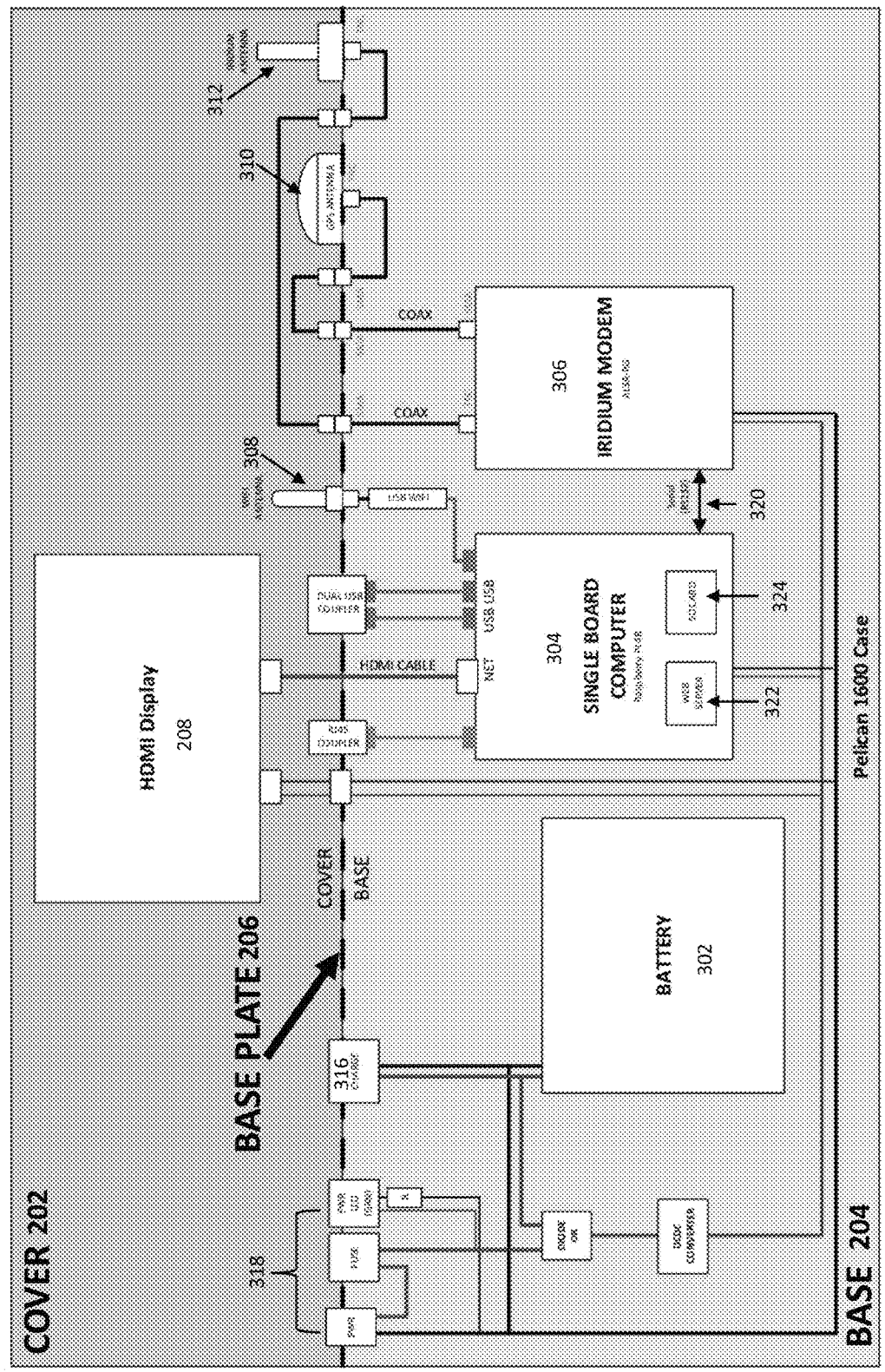
FIG. 3 illustrates example components of a deck box device, in accordance with disclosed aspects.

FIG. 2 illustrates an example deck box device 100, and FIG. 3 illustrates example components of a deck box device 100. As shown, the deck box device 100 may include a housing 201, which may include a cover portion 202 and a base portion 204, which may be covered by a base plate 206. Housing 201 may enclose, hold, or coupled to one or more features or components of the deck box device 100. Housing 201 may be, for example, plastic, rubber, or some other material. Housing 201 may comprise a Pelican type case. Housing 201 may provide for a portable deck box device 100. For example, the deck box device 100 may having a housing 201 that may be about 40-70 cm×30-50 cm×15-30 cm, or the like, such as to, for example, provide for a carrying case for protection and ease of transport.

The base portion 204 may include a battery 302, a processing device 302, and a modem device 306. The battery 302 may provide power to one or more other components of the deck box device 100, such as via different internal converters, diodes, lines, etc. The battery 302 may be connected to change indicator 316, which may light up if the battery 302 falls below a charge level. The battery 302 may be connected to power indicator component(s) 318, which may indicate whether the device is on or off. The battery 302 may be connected to provide power to the display 208, to the computing device 304, and/or to the modem 306. The modem 306 may be coupled to the processing device 304 via a connection 320, where the processing device 304 may send information or instructions to the modem 306, and the modem can send information to the processing device 304.

The deck box device 100 may use a Wi-Fi antenna 308 to communicate with one or more other devices 210*a-c* (FIG. 2). The processing device 304 may include a web server 322 and a storage device 324 (e.g., SD card). The storage device 324 may store data. For example, the deck box device 100 may use the Wi-Fi antenna 308 to transmit to one or more other devices 210*a-c* any data received from the one or more sources 102*a-c* (or information associated with the data). For example, a visualization or other output may be generated from the received data, which the deck box device 100 can transmit to one or more devices 210*a-c* for their output or execution.

The deck box device 100 may generate a local area network via the web server 322 that can provide a local webpage and/or IP address that any device connected to the local area network can access a locally hosted website and visualization of the data. The connection could by another means, such as wired Ethernet. In an example, if the deck box device 100 is on a ship in one area (e.g., in the captain's area), the information and/or visualization generated by the deck box device 100 can be provided via web server 322 to other devices and personnel on the ship that are connected to the local area network. In some embodiments, the web server 322 is disconnected from the internet.

In some cases, devices 210*a-c* may use the received output from the deck box device 100 to conduct, perform, and/or actuating a strategic operation, such as a water-based operation ground-based operation, or air-based operation, associated with the one or more sampling sensor devices 102*a-c* based on the received input or generated visualization. For example, one or more devices 210*a-c* may use velocity, geolocation, depth in fluid, spatial orientation, direction, or timestamp associated with one of the sensor devices 102*a-c* to perform a water-based operation. In some cases, the strategic operation may be a defensive tactical operation or naval operation. In some other cases, the strategic operation may be to change one of the characteristics, such as to instruct the sensor device 10*a-c* to modify movement, velocity, depth, height, or other characteristic and/or the like.

The receiving device (e.g., Iridium antenna 310 and/or modem 306) of the deck box device 100 may receive one or more data messages from respective sampling devices 102*a-c* via the point-to-point connection. The data messages may include Short Burst Data packets containing respective sampling data. According to some aspects, the Iridium satellite 104 may receive the sampled data from the sensor devices 102*a-c* and transmit the sampled data in Short Burst Data packets to the Iridium gateway 106. The gateway 106 may transmit the Short Burst Data packets to satellite 108. The satellite 108 may transmit the Short Burst Data packets via the point-to-point connection to the Iridium antenna. The Iridium antenna may be coupled to an Iridium modem, which may then receive the Short Burst Data packets (i.e., the received message(s)).

In some embodiments, data may be transmitted in a multi-packet SBD message, which may send a single message in multiple packets due to a size limit on a single SBD message. In this case, the processing device 304 may use the plurality of packets in transmitted multi-packet SBD message to process the intended message. This may be the case where higher sized data is transmitted from a sensor device 102*a-c*, such as sending images, or the like.

The Iridium modem 306 may be connected to a processing device 304, which may be a single board computer (e.g., a Raspberry Pi, or the like). The processing device 304 may be coupled to an output device, such as display 208, such as via a cable or other means. The processing device 304 may parse the Short Burst Data packets of each data message to retrieve the sampled data from the sensor devices 102*a-c*. The processing device 304 may convert the retrieved sampled data from each respective data message and/or packet into a common format for all of the sensor devices 102*a-c*.

For example, the processing device 304 may parse and convert the sampled data into a common format, such as a common file format, like a JSON format. In some cases, the data may be converted to a DatBase SQLite, or GeoJSON, or MySQL format. The converted common formatted data may then be stored in a storage device 324 (or some other data storage device). The processing device 304 may retrieve the stored data associated with one or more of the sensor devices 102*a-c* to determine one or more characteristics associated with a respective sensor device 102*a-c*.

The processing device 304 may be connected to a display 108, such as via an HDMI cable. The processing device 304 may generate a visualization associated with the one or more characteristics on the display. This may allow a user to view one or more relationships between the sensor devices 102*a-c* based on respective characteristics of the sensor devices 102*a-c*. A strategic operation (e.g., water-based operation, ground-based operation, and/or air-based operation) associated with the one or more sensor devices 102*a-c* may then be actuated based on the generated visualization. For example, a water-based operation may include performing a defensive tactical operation for a military organization.

According to some aspects, and in at least one example according to disclosed features, data retrieval from sensors aboard unmanned research and development assets (e.g., sensor devices 102a-c) is important for scientific and research efforts. As the number of assets grows, it becomes more complicated to retrieve and process the data in a timely manner.

Aspects herein provide for a framework which can rapidly ingest, process, and visualize large volumes of data obtained from assets (e.g., R&D assets) in real time. The assets (e.g., sensor devices 102a-c) may be deployed at different and separate locations, such as throughout the world or anywhere that might provide communication capability to a satellite network.

In some embodiments, one or more aspects described herein may include use of an Iridium satellite network. In some cases Short Burst Data (SBD) packets may be sent to a local email server for data ingest. Data ingest and processing may be performed by the processing device 304, such as by leveraging a multiprocessing module (e.g., in Python) to concurrently process incoming SBD data packets. The data may be written into a common format, such as JavaScript Object Notation (JSON) formation, SQLite, MySQL, or the like, to provide interoperability. Processed data may be accessed through a web-based graphical information system (GIS), which may allow the user to obtain rapid feedback on a device or sensor deployed in the field.

Deck box device 100 may include other components, such as those shown in FIGS. 2 and 3, where some may be conventional or otherwise used to operate the deck box device 100. For example, deck box device 100 may include one or more lights (LED), speakers, displays, couplers, ports (USB, Ethernet, and the like), and other components.

In some embodiments, the deck box device 100 can include more than one type of receiver/antenna/connectivity/modem type. For example, the deck box device 100 may be configured with components and capability for Iridium, cellular connection, line-of-sight radio connection, and/or Wi-Fi connection for the receiving device to receive data sampled by the one or more senor devices 102a-c.

Figure 4:
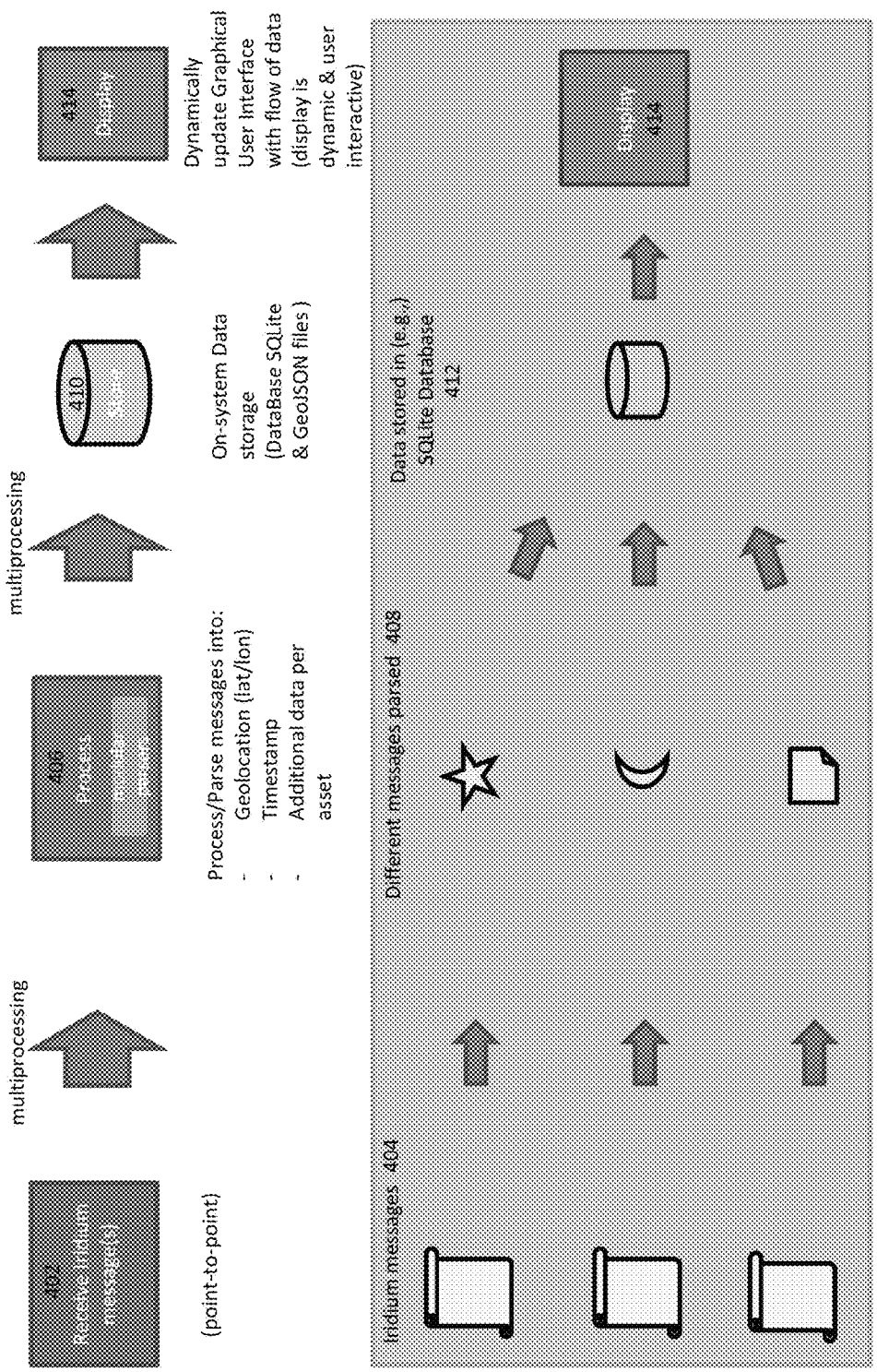
FIG. 4 illustrates a flow diagram schematic illustrating an example process for operating a deck box, in accordance with disclosed aspects.

FIG. 4 illustrates a flow diagram illustrating a process 400 for operating a deck box device 100 in accordance with one or more disclosed aspects. One or more steps of process 400 may include one or more features such as described herein, such as described with respect to the timing diagram shown in and described with respect to FIGS. 1-3. Process 400 may begin at step 402.

At step 402, the deck box device 100 may receive one or more Iridium messages 404 from an Iridium satellite system 108. The deck box device 100 may include an Iridium antenna 312 and/or Iridium modem 306 that may be configured to receive the Iridium satellite communications that may be based in the L-band frequency range. In some cases, there may be an established point-to-point connection between the deck box device and the satellite system 108 via the Iridium gateway 106. The satellite 108 may receive sampled data from one or more of the sensor devices 102a-c. The Iridium antenna 312 of the deck box device 100 may receive data message(s) from a sensor device 102a-c via the established point-to-point connection, where each data message 404 can include Short Burst Data packets containing respective sampled data of a sensor device 102a-c. In some cases, the receipt of the data messages 404 may be independent of an internet communication (i.e., without using a connection to the internet to receive the messages).

At step 406, the deck box device 100 may process the received data messages, such as using a processing device 304. For example, the processing device 304 can generated parsed information 408, such as by parsing the Short Burst Data packets of each data message 404 to retrieve the sampled data provided by a sensor device 102a-c. In some cases, one or more modular parsing devices (e.g., included in the deck box device 100, such as in processing device 304) may be used to parse the messages 404 into one or more characteristics/information, for example, geolocation (latitude, longitude), timestamp, and/or other data. In embodiments using multi-packet SBD, the parsing device may wait until all of the packets are received before parsing the message using all of the received packets associated with that message.

The processing device 304 may convert the retrieved sampled data into a common format, such as a JSON format. For example, after a message 404 is received by the deck box device 100, the processing device 304 may extract the body and/or attachment in the message 404. This information may be saved as an intermediate or temporary JSON. After this, the intermediate JSON may be processed by checking an identifier in a registry corresponding to the saved intermediate JSON. Based on the identifier (which may be based on the type of information is included in the data or based on the type of sensor device 102a-c that provided the information), a corresponding parsing device may be selected to parse the intermediate JSON.

The sampled data may be parsed by the parsing device to retrieve the information and characteristics associated with the corresponding device 102a-c. The retrieved information may then be formatted to a common-type JSON. At step 410, the common-type JSON may be stored in a database 412. The database 412 may be an on-system data storage device, such as device 324. The data may include one or more characteristics associated with the converted sampled data. At step 414, the processing device 304 may generate an output via an output device (e.g., a visualization device via display 208) based on the one or more characteristics.

Reduction to Practice Example

Figure 5:
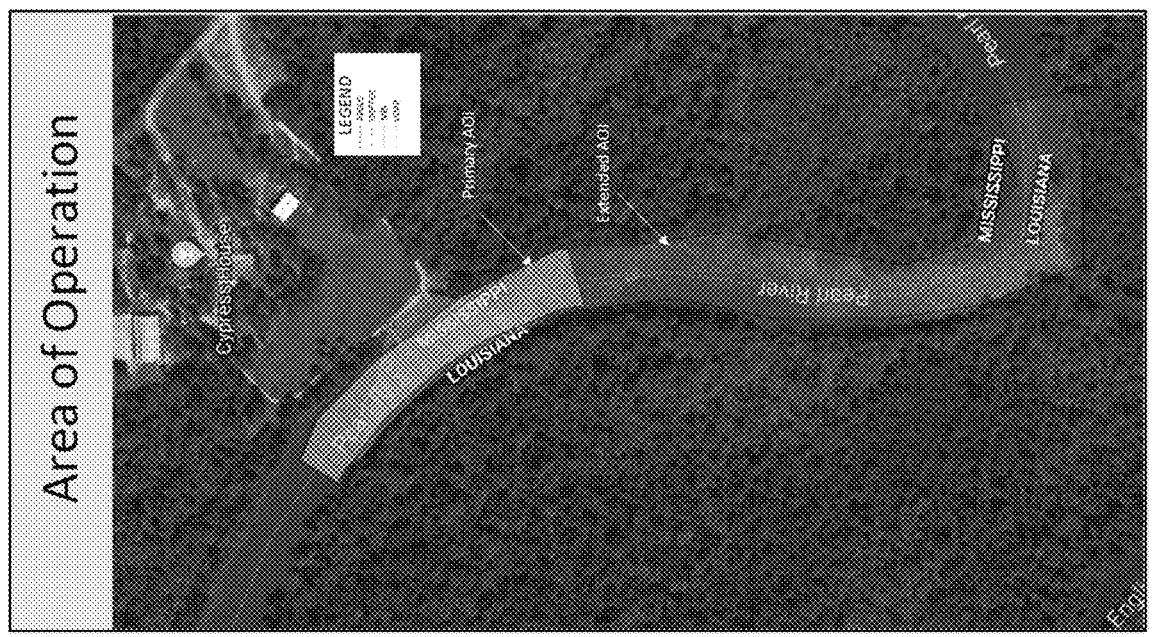
FIG. 5 illustrates the area of operation of tests performed along the Pearl River, LA, performed in accordance with disclosed aspects.
Figure 6:
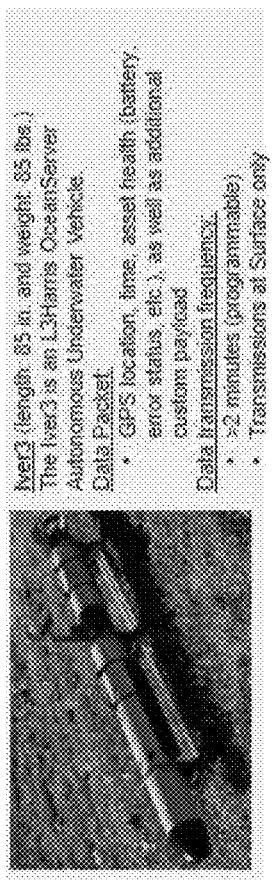
FIG. 6 illustrates the types of sensors and assets tested in accordance with disclosed aspects.
Figure 6:
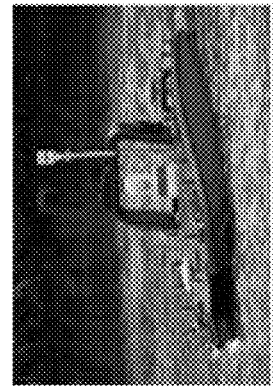
Figure 6:
Figure 6:
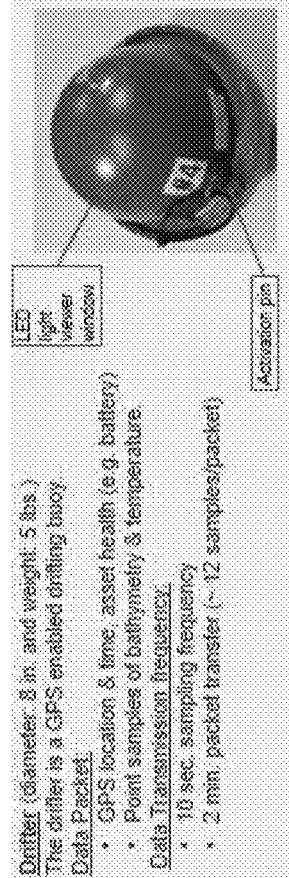
Figure 7:
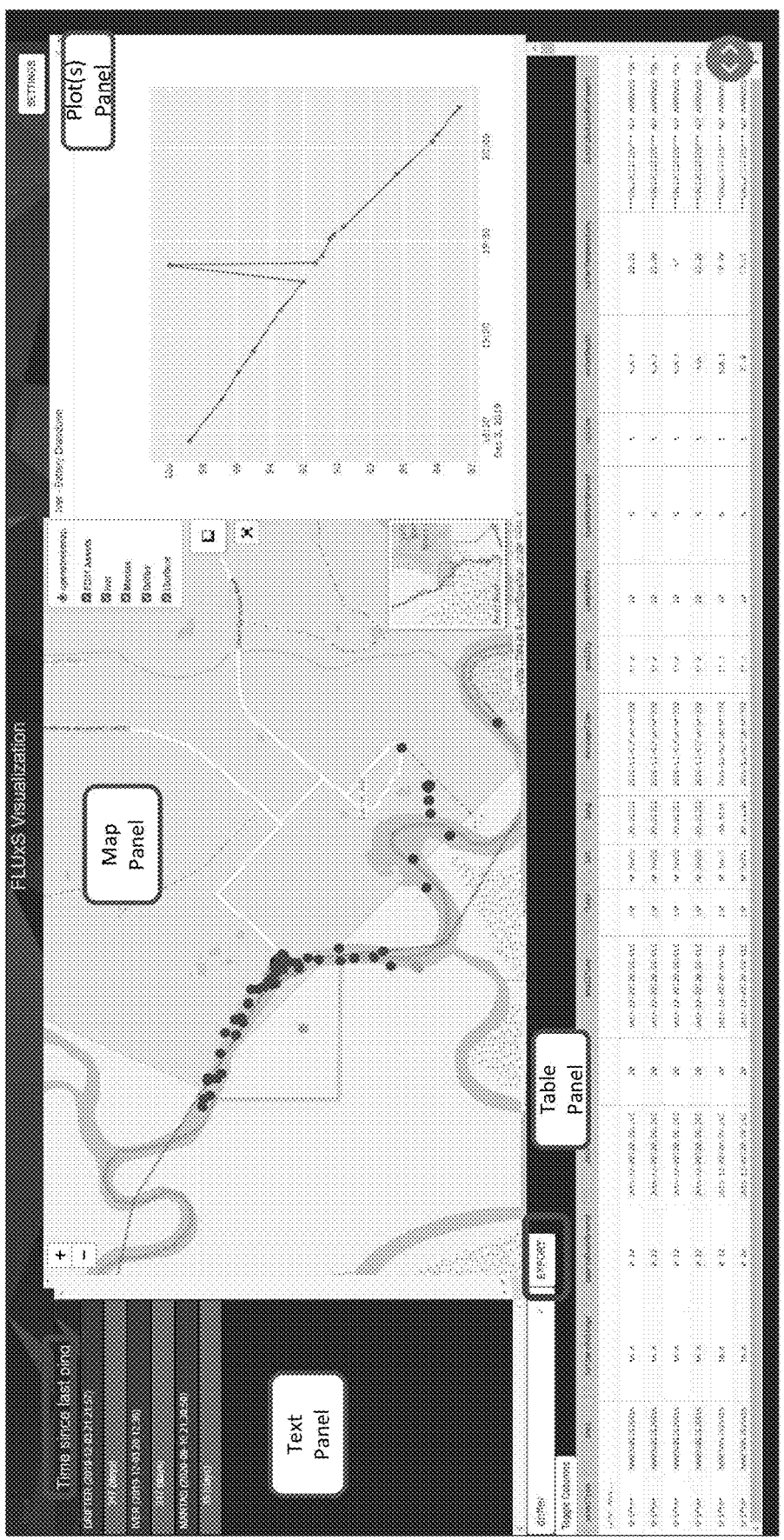
FIG. 7 illustrates an example visualization of the tests in accordance with disclosed aspects.

FIGS. 5-7 provide illustrates to support an example reduction to practice of a specific application on the Pearl River, near Stennis Space Center, Mississippi. Features described herein were packaged in a software package in accordance with aspects described herein and in an example deck box device 100, which was used to aggregate, process, and visualize asset transmission data from a field day practice exercise.

FIG. 5 illustrates the area of operation of the tests performed along the Pearl River in accordance with disclosed aspects. FIG. 6 illustrates the type of sensors and assets (e.g., element 102) tested in accordance with disclosed aspects. FIG. 7 illustrates an example visualization in accordance with disclosed aspects.

As shown, there were a total of 6 assets (4 types) deployed: 1 Iver; 1 Mantas; 1 iSurface; and 3 Drifters. A total of 1,817 pings were received in accordance with aspects described in FIGS. 1-4 (e.g., via an Iridium Satellite system 108 and deck box device 100).

As shown in FIG. 6, the Iver3 is an L3Harris OceanServer Autonomous Underwater Vehicle, having the following features: len.: 85 in. and wt: 85 lbs. The Iver3 can transmit a data packet having GPS location, time, asset health (battery, error status, etc.), as well as additional custom payload. The Data transmission frequency is >2 minutes (programmable) and provides transmissions at surface.

The drifter is a GPS enabled drifting buoy with the following features: dia.: 8 in. and wt: 5 lbs. The drifter can transmit a data packet having GPS location & time, asset health (e.g. battery), as well as point samples of bathymetry & temperature. The Data Transmission frequency is a 10 sec. sampling frequency, with 2 min. packet transfer (~12 samples/packet).

The iSurface is a self-contained Iridium satellite beacon with the following features: len.: ~21 in. and wt.: ~5 lbs. The iSurface can transmit a data packet having GPS location, time, fix, accuracy, and speed. The Data Transmission frequency is ~5 min. for one hour, and after one hour, a user defined frequency.

The Mantas is an unmanned surface vehicle with the following features: len.: 144 in. and wt.: 400 lbs. The Mantas can transmit a data packet having GPS location/time, asset health (battery, error status, asset id #.), as well as additional custom payload. The data transmission frequency is ~5 min., with month-long mission times and solar panel charging.

In the test, the Iver3, drifter, iSurface, and Mantas assets sampled data and transmitted it to the deck box device 100, such as described herein.

As shown on FIG. 7, the FLUxS Deck Box display can be generated based on one or more sampled characteristics associated with each deployed asset/sensor device. For example, as shown, the display can provide asset metadata (left panel), map view (center), custom analysis plots (right), and table view (bottom) capable of filtering and exporting the acquired aggregated data.

In one example, the data on the left panel can provide the timestamp as well as the elapsed time since the last response received from the assets. In one example, this visualization and/or data can help gauge asset health or connectivity. The data in the center panel can provide location data superimposed on a map, which can be used to track asset movements or locations. The right most panel can allow for display of custom (e.g., end user defined) plotting algorithm(s), such as using the data retrieved from the assets. The bottom (table view) panel can provide the aggregated data for view at a glance or for export, such as to be used in post processing.

In some embodiments, the map view can plot the location of assets and the location of the deck box device 100 on the map. The points on the map can be color coded by asset type, by age of the asset data transmission, by number of message from asset, by sensor values (e.g., depth of water, temperature), and/or the like. In some embodiments, the plots may provide battery drawn down (battery vs. time), temperatures vs. time, total distance traveled by each asset over time, histogram of asset data rates, and/or the like.

Figure 8:
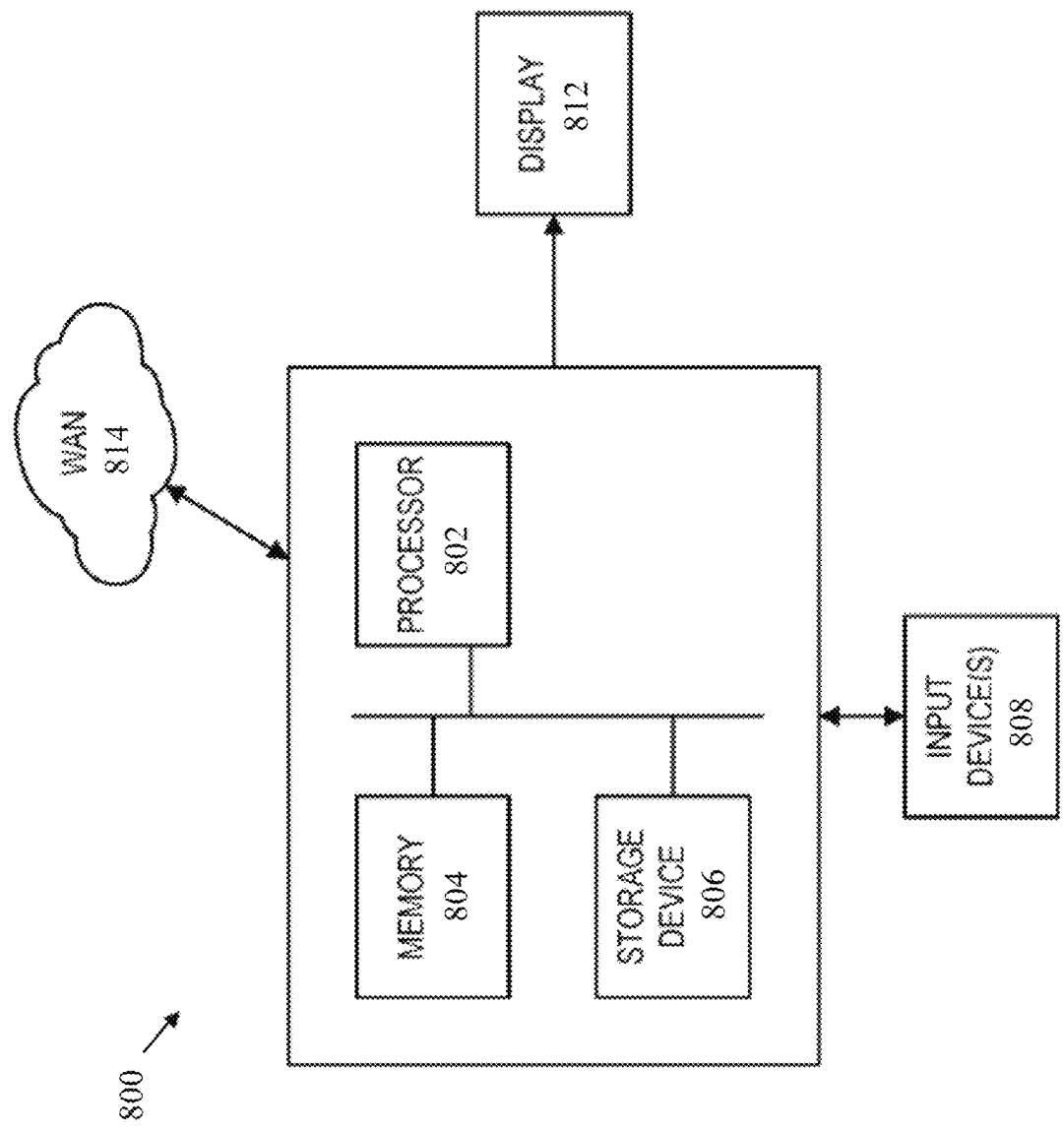
FIG. 8 illustrates a diagram of an example computer system, in accordance with one or more disclosed aspects.

One or more aspects described herein may be implemented on virtually any type of computer regardless of the platform being used. For example, as shown in FIG. 8, a computer system 800 includes a processor 802, associated memory 804, a storage device 806, and numerous other elements and functionalities typical of today's computers (not shown). The computer 800 may also include input means 808, such as a keyboard and a mouse, and output means 812, such as a monitor or LED. The computer system 800 may be connected to a local area network (LAN) or a wide area network (e.g., the Internet) 814 via a network interface connection (not shown). Those skilled in the art will appreciate that these input and output means may take other forms.

Further, those skilled in the art will appreciate that one or more elements of the aforementioned computer system 800 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device.

Embodiments for a forward deployable deck box system for the aggregation and visualization of distributed assets has been described. Although particular embodiments, aspects, and features have been described and illustrated, one skilled in the art would readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A method, comprising:
configuring, an Iridium antenna of a deck box device, to receive satellite communications based in the L band frequency range;
establishing, by the deck box device, a point-to-point connection with an L-band satellite communication device via a gateway device, the L-band satellite communication device configured to receive sampled data from one or more sampling devices;
receiving, by the Iridium antenna of the deck box device, one or more data messages from a respective sampling device via the established point-to-point connection, each data message comprising Short Burst Data packets containing respective sampled data;
parsing, by a processing device of the deck box device, the Short Burst Data packets of each data message to retrieve the sampled data;
converting, by the processing device of the deck box device, the retrieved sampled data from each respective data message into a common format;
responsive to the converting, determining, by the processing device of the deck box device, one or more characteristics associated with the converted sampled data;
generating, by a display device of the deck box device, a visualization based on the one or more determined characteristics; and
actuating a strategic operation associated with the one or more sampling devices based on the generated visualization.

2. The method of claim 1, wherein the L-band satellite communication device comprises an Iridium satellite.

3. The method of claim 1, wherein the one or more characteristics comprises velocity, geolocation, depth in fluid, spatial orientation, direction, or timestamp.

4. The method of claim 1, wherein the one or more sampling devices comprises homogenous asset types, heterogeneous asset types, or combinations thereof.

5. The method of claim 1, wherein the one or more sampling devices comprises at least one of a drifter device, an autonomous vehicle, a satellite beacon, a manned vehicle, a device with sensor payload, or an unmanned surface vehicle.

6. The method of claim 1, wherein the strategic operation comprises a water-based operation, ground-based operation, or air-based operation.

7. The method of claim 1, wherein the strategic operation comprises a defensive tactical operation.

8. The method of claim 1, wherein the receiving occurs independent of an internet connection.

9. The method of claim 1, wherein the gateway device comprises a secure gateway device associated with defensive tactical operations.

10. The method of claim 1, wherein the sampled data received by the L-band satellite communication device from the one or more sampling devices is formatted based on a type of sampling device associated with the received message.

11. The method of claim 1, wherein receiving the one or more data messages further comprises receiving the one or more data messages by an Iridium modem prior to the parsing.

12. A deck box device, comprising:
a processing device coupled to a memory device storing executable instructions;
an Iridium antenna configured to receive satellite communications based in the L band frequency range; and
a display device,
wherein execution of the executable instructions causes the processing device to perform:
establishing, by the deck box device, a point-to-point connection with an L-band satellite communication device via a gateway device, the L-band satellite communication device configured to receive sampled data from one or more sampling devices;
receiving, by the Iridium antenna of the deck box device, one or more data messages from a respective sampling device via the established point-to-point connection, each data message comprising Short Burst Data packets containing respective sampled data;
parsing, by the processing device of the deck box device, the Short Burst Data packets of each data message to retrieve the sampled data;
converting, by the processing device of the deck box device, the retrieved sampled data from each respective data message into a common format;
responsive to the converting, determining, by the processing device of the deck box device, one or more characteristics associated with the converted sampled data;
generating, by the display device of the deck box device, a visualization based on the one or more determined characteristics; and
actuating a strategic operation associated with the one or more sampling devices based on the generated visualization.

13. The deck box device of claim 12, wherein the L-band satellite communication device comprises an Iridium satellite.

14. The deck box device of claim 12, wherein the one or more characteristics comprises velocity, geolocation, depth in fluid, spatial orientation, direction, or timestamp.

15. The deck box device of claim 12, wherein the one or more sampling devices comprises homogenous asset types, heterogeneous asset types, or combinations thereof.

16. The deck box device of claim 12, wherein the one or more sampling devices comprises at least one of a drifter device, an autonomous vehicle, a satellite beacon, a maimed vehicle, a device with sensor payload, or an unmanned surface vehicle.

17. The deck box device of claim 12, wherein the strategic operation comprises a water-based operation, ground-based operation, or air-based operation.

18. The deck box device of claim 12, wherein the strategic operation comprises a defensive tactical operation.

19. The deck box device of claim 12, wherein the receiving occurs independent of an internet connection.

20. The deck box device of claim 12, wherein the gateway device comprises a secure gateway device associated with defensive tactical operations.

21. The deck box device of claim 12, wherein the sampled data received by the L-band satellite communication device from the one or more sampling devices is formatted based on a type of sampling device associated with the received message.

22. The deck box device of claim 12, wherein receiving the one or more data messages further comprises receiving the one or more data messages by an Iridium modem prior to the parsing.

23. A non-transitory computer readable medium comprising computer code, the computer code, when executed by a processor, performing steps to:
establish, by a deck box device, a point-to-point connection with an L-band satellite communication device via a gateway device, the L-band satellite communication device configured to receive sampled data from one or more sampling devices;
receive, by an Iridium antenna of the deck box device, one or more data messages from a respective sampling device via the established point-to-point connection, each data message comprising Short Burst Data packets containing respective sampled data, the Iridium antenna configured to receive satellite communications based in the L band frequency range;
parse, by a processing device of the deck box device, the Short Burst Data packets of each data message to retrieve the sampled data;
convert, by the processing device of the deck box device, the retrieved sampled data from each respective data message into a common format;
responsive to the converting, determine, by the processing device of the deck box device, one or more characteristics associated with the converted sampled data;
generate, by a display device of the deck box device, a visualization based on the one or more determined characteristics; and
actuate a strategic operation associated with the one or more sampling devices based on the generated visualization.

24. The non-transitory computer readable medium of claim 23, wherein the L-band satellite communication device comprises an Iridium satellite.

\* \* \* \* \*